M. C. FONTAINE.
MIRROR ADJUSTER.
APPLICATION FILED DEC. 2, 1916.
1,262,765.
Patented Apr. 16, 1918.
2 SHEETS—SHEET 2.
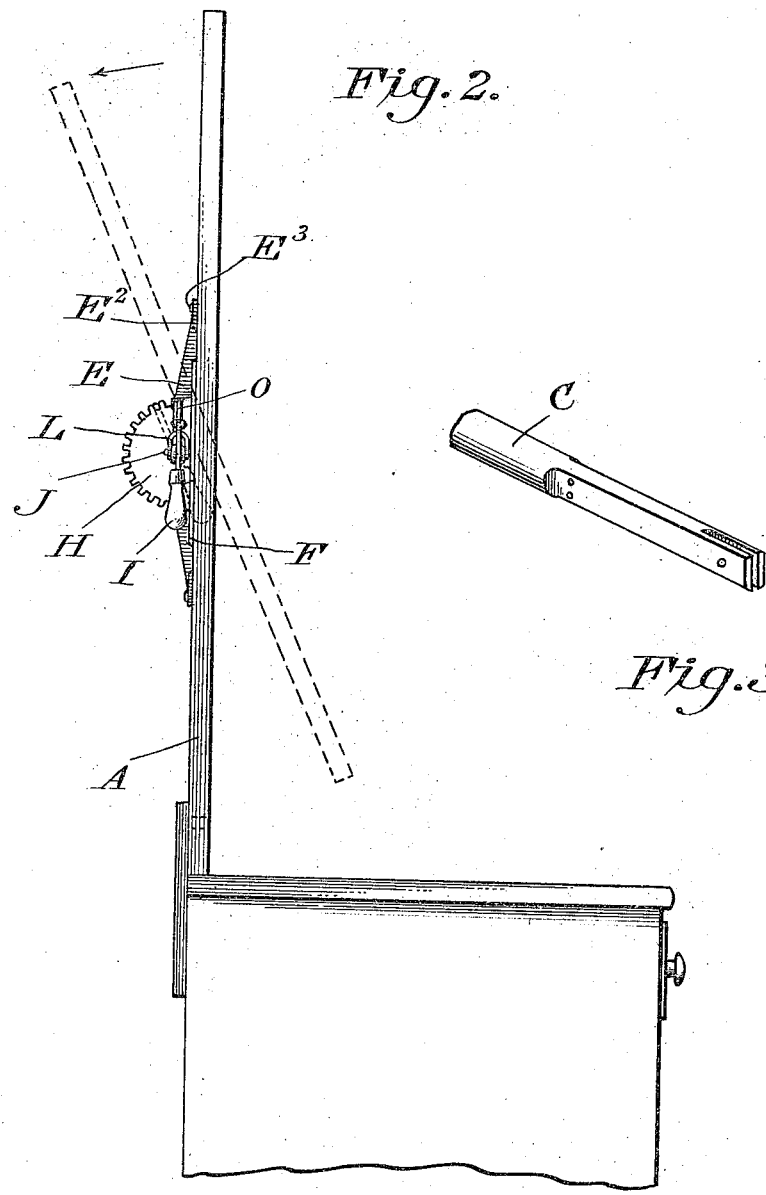

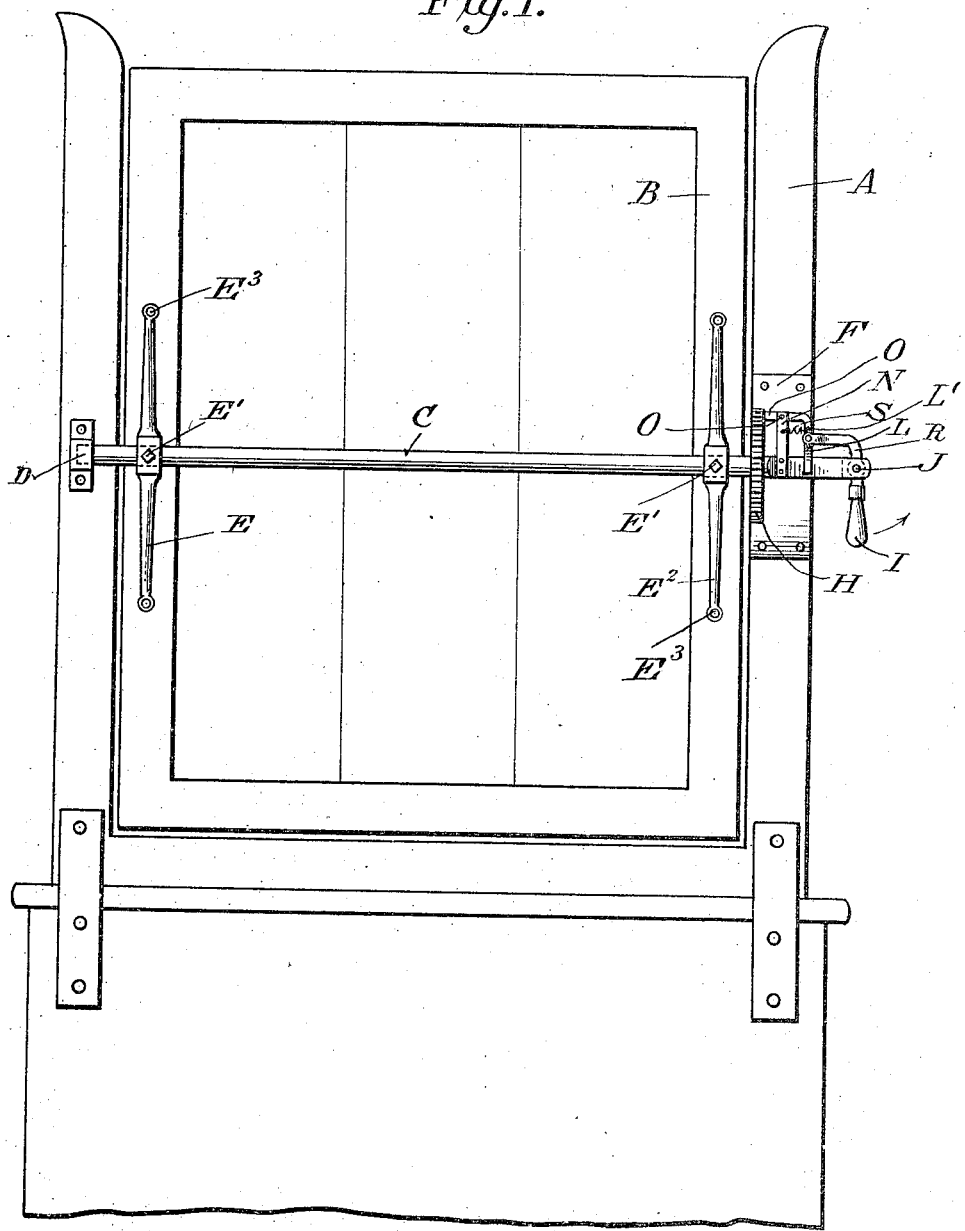

UNITED STATES PATENT OFFICE.

MILES CARY FONTAINE, OF MEMPHIS, TENNESSEE.

MIRROR-ADJUSTER.

1,262,765.   Specification of Letters Patent.   Patented Apr. 16, 1918.

Application filed December 2, 1916. Serial No. 134,653.

*To all whom it may concern:*

Be it known that I, MILES C. FONTAINE, a citizen of the United States, residing at Memphis, in the county of Shelby and State of Tennessee, have invented certain new and useful Improvements in Mirror-Adjusters; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in mirror adjusters and especially in the provision of a means whereby the mirror may be held in different adjusted positions.

The invention comprises a simple and efficient device of this nature having various details of construction, combinations and arrangements of parts which will be hereinafter fully described, shown in the accompanying drawings and then specifically defined in the appended claims.

I illustrate my invention in the accompanying drawings, in which:—

Figure 1 is a rear elevation of a mirror showing the application of my invention.

Fig. 2 is a side elevation.

Fig. 3 is a sectional view on line 3—3 of Fig. 1.

Reference now being had to the details of the drawings by letter, A designates the posts of the frame supporting the mirror B. C is a shaft journaled in the bearings D upon said frame, said shaft projecting beyond one of the posts, as shown in Fig. 1 of the drawings. Yokes E receive said shaft C, and set screws E' pass through the yokes and are adapted to engage the shaft. Said yokes have laterally extending arms E² which are flattened and are secured at E³ to the mirror. A plate F is secured to one of the posts A and has a curved segment member H projecting therefrom with ratchet teeth thereon. A lever I is pivotally mounted in the slot in the end of the shaft C, said lever being angled and is provided with a bifurcated end pivoted to a pawl L, which in turn is pivotally connected to the bar N. Said bar N is fixed to the shaft C. Said pawl has a bifurcated end L which moves over the shaft C, serving to guide the pawl as it swings on its pivot. A coiled spring S is fastened at one end to the member L and its other end to the bar N and serves to return the pawl to its normal position after having been thrown out of engagement with the teeth of the segment as the lever I is swung upon its pivot.

In operation, it will be noted that the mirror is normally held in any adjusted position and, when it is desired to swing the mirror to different inclinations, the lever I is swung upon its pivot which will throw the pawl out of engagement with the teeth of the segment member, after which the mirror will be free to swing with the shaft to different positions. When the lever I is released, the pawl will normally be thrown back into engagement with one of the teeth of the segment member, thereby holding the mirror in one of its adjusted positions.

What I claim to be new is:—

1. An adjuster for mirrors, comprising, in combination with a frame and a shaft journaled thereon, a mirror mounted upon said shaft, a ratchet segment member fixed to the frame, a lever pivoted to the shaft, a pawl actuated by the lever and adapted to engage the teeth of the segment to hold the mirror in different adjusted positions.

2. An adjuster for mirrors, comprising, in combination with a frame and a shaft journaled thereon, a mirror mounted upon said shaft, a ratchet segment member fixed to the frame, a lever pivoted to the shaft, a supporting bar fastened to the latter, a pawl pivoted to said support, and connections between said pawl and lever.

3. An adjuster for mirrors comprising, in combination with a frame and a shaft journaled thereon, a mirror mounted upon said shaft, a ratchet segment member fixed to the frame, a lever pivoted to the shaft, a supporting bar fastened to the latter, a pawl pivoted to said support, a guide member connected to said pawl and having a bifurcated end movable over said shaft, and link connections between said member and lever.

In testimony whereof I hereunto affix my signature in presence of two witnesses.

MILES CARY FONTAINE.

Witnesses:
JNO. H. WILLIFORD,
MARTHA WILLIFORD.

Copies of this patent may be obtained for five cents each, by addressing the "Commissioner of Patents, Washington, D. C."